No. 894,458. PATENTED JULY 28, 1908.
T. OLDFIELD & J. A. SCHOFIELD.
RESILIENT WHEEL OF MOTOR CARS AND OTHER SUITABLE ROAD VEHICLES.
APPLICATION FILED MAR. 11, 1907.

3 SHEETS—SHEET 1.

WITNESSES
a. Wm Reed
Wilfred Alderson

INVENTORS
Tom Oldfield
Joseph Arthur Schofield
per John E. Walsh
Attorney

No. 894,458. PATENTED JULY 28, 1908.
T. OLDFIELD & J. A. SCHOFIELD.
RESILIENT WHEEL OF MOTOR CARS AND OTHER SUITABLE ROAD VEHICLES.
APPLICATION FILED MAR. 11, 1907.

3 SHEETS—SHEET 2.

No. 894,458. PATENTED JULY 28, 1908.
T. OLDFIELD & J. A. SCHOFIELD.
RESILIENT WHEEL OF MOTOR CARS AND OTHER SUITABLE
ROAD VEHICLES.
APPLICATION FILED MAR. 11, 1907.
3 SHEETS—SHEET 3.
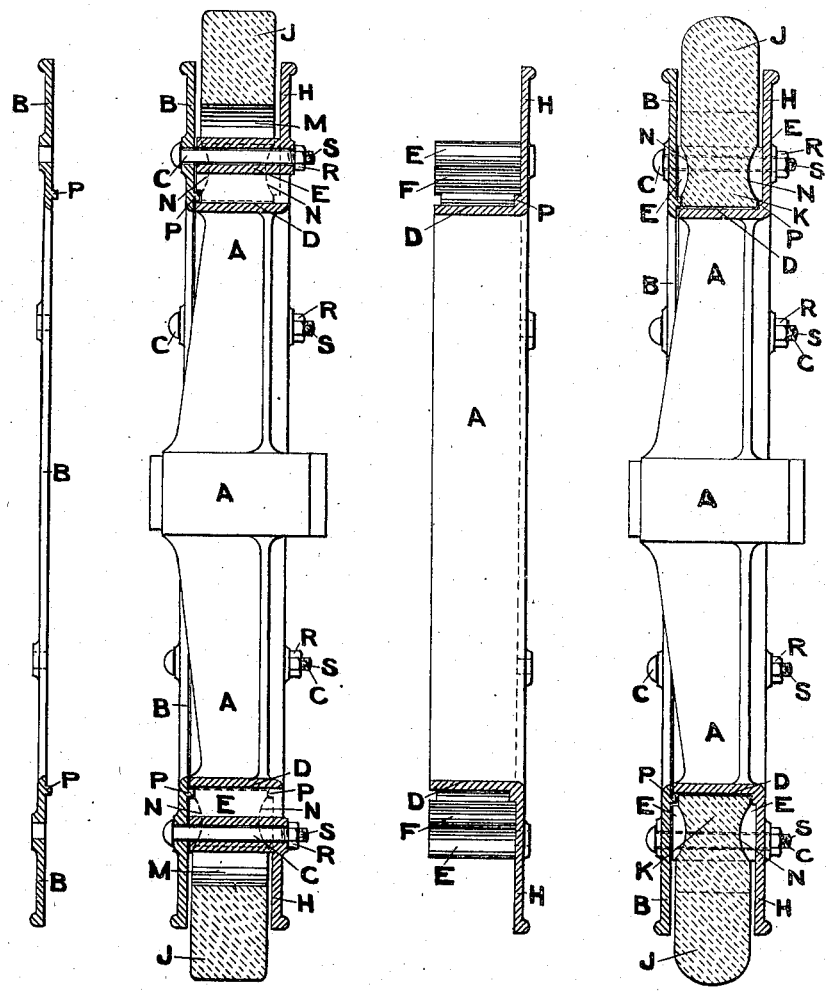

UNITED STATES PATENT OFFICE.

TOM OLDFIELD AND JOSEPH A. SCHOFIELD, OF HALIFAX, ENGLAND.

RESILIENT WHEEL OF MOTOR-CARS AND OTHER SUITABLE ROAD-VEHICLES.

No. 894,458.  Specification of Letters Patent.  Patented July 28, 1908.

Application filed March 11, 1907. Serial No. 361,805.

*To all whom it may concern:*

Be it known that we, TOM OLDFIELD and JOSEPH ARTHUR SCHOFIELD, subjects of the King of Great Britain, residing at Halifax, in the county of York, England, have invented new and useful Improvements in Resilient Wheels of Motor-Cars and other Suitable Road-Vehicles, of which the following is a specification.

This invention relates to the construction of resilient wheels of motor cars and other suitable road vehicles, and our object is to construct said wheels in such a manner that their resiliency and surface contact at any point where resistance is offered to the tire, are equal to those of wheels possessing pneumatic tires, but with the further advantage that the resiliency of our improved wheel is in no way affected by a puncture of the tire.

According to our invention we construct the wheel in two parts, consisting of the hub and rim with their connections, and a ring. The rim has a number of radial projections of particular design upon its periphery and a flange upon one side. The ring is bolted to the other side of rim forming a channel within which fits the rubber tire; this ring is removed to remove or replace the tire. We also form the tire of solid rubber with depending projections corresponding in number and more or less in shape, with the spaces between the radial projections aforesaid. The spaces between the projections on the tire are deeper than the projections in the channel, and so leave a suitable chamber at the top of each projection. These chambers increase the elasticity of the tire at the point of contact, and said tire in cushioning more or less against the heads of the projections, also increases the surface contact of the tire and its gripping action upon the road.

Suitable provision is made in the construction of the tire to prevent chafing or friction against the sides of said channel. We attain these objects by the mechanism illustrated in the accompanying drawings, in which—

Figure 1:
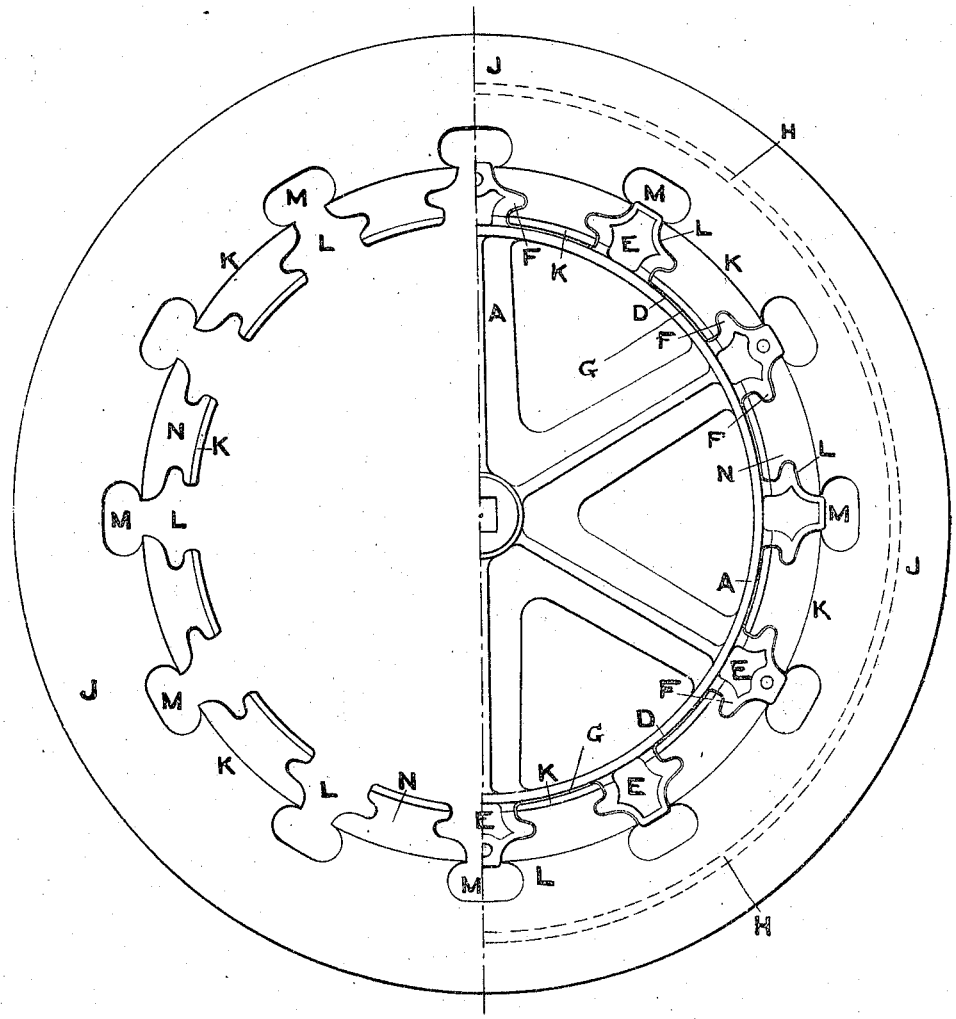
Figure 2:
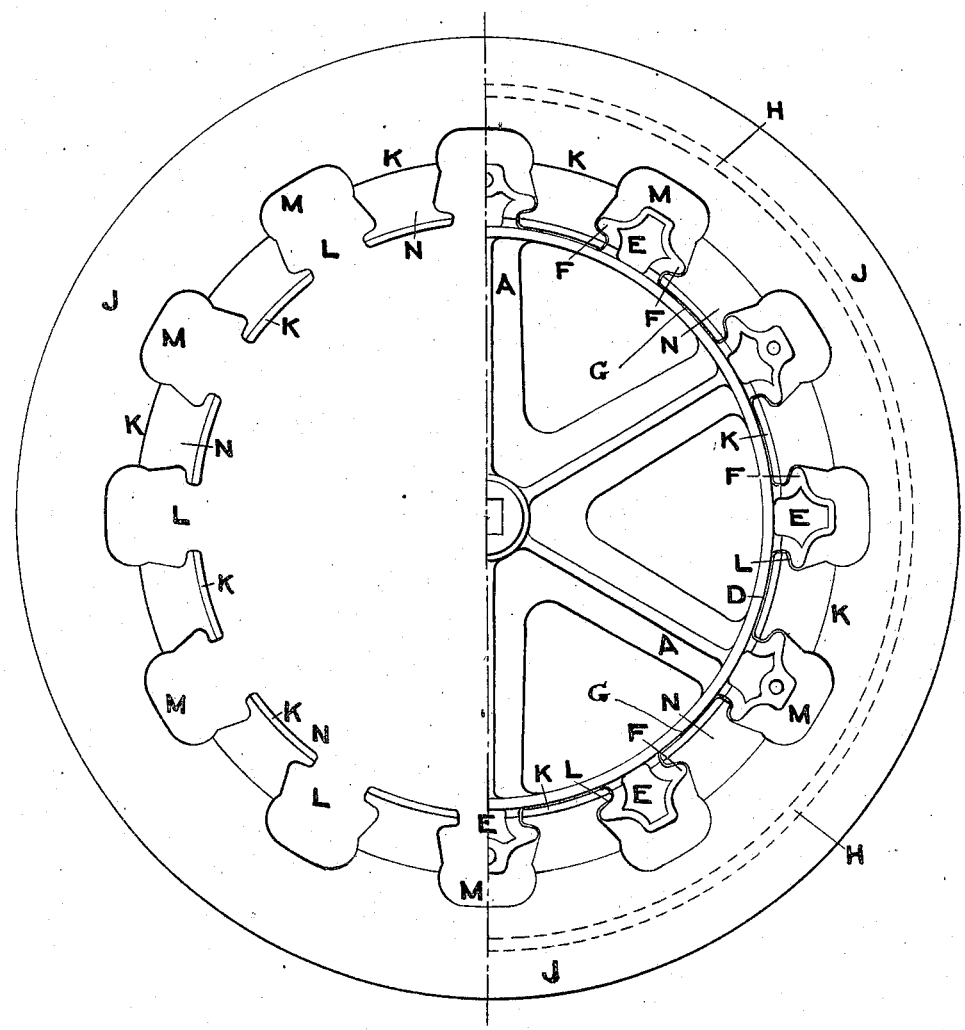

Figure 1 is a side elevation of our improved resilient wheel with fixing ring or loose flange removed, showing the construction of tire as applied to the back or driving wheels of motor or other suitable road vehicles, and the method of fitting the same to the rim or felly. Fig. 2 is a similar view to Fig. 1, showing a modified construction of tire and method of fitting the same upon the rim of the front or non-driven wheels of motor or other suitable road vehicles. Fig. 3 is a sectional view of fixing ring. Fig. 4 is a transverse section of Fig. 1. Fig. 5 is a transverse section of the rim portion of our improved wheel. Fig. 6 is a transverse section of Fig. 2.

Similar letters of reference refer to similar parts throughout the several views.

In constructing our resilient wheel we preferably form the same in two parts, one part A consists of the hub and rim with their connections, and the other part B of a ring, which is secured to the rim portion by bolts C. Upon the periphery D of the rim we form suitable radial projections E having lugs or wings F at each side in order to give a dovetail or inverted T shape to the intervening spaces G. The rim has a vertical flange H at one side, which with the ring B, secured in position, forms a channel between the two for receiving the tire. We also form the rubber tire J with radial projections K depending from its inner surface, corresponding in number and more or less in shape with the spaces G at the bottom of the channeled rim. The spaces L between the projections K are deeper than the said projections E and of such a shape that cushioning chambers M are formed at the end of each projection E.

The projections E may be hollow or solid as desired, they also form a bed or seating for the ring B, and the bolts pass through same when securing the latter to the rim portion.

In order that there may be no friction or chafing of the sides of the tire against the sides of the channel and a free radial compression and expansion of the tire obtained at any point of contact no matter what load may be put upon the wheel, we make the said tire narrower than the channel, and in addition hollow out or cut away a portion N upon each side of the projections K, see Figs. 4 and 6. The spaces or clearances between tire and flange provide for any ordinary compression consequent upon the load upon the wheel, and allow an easy radial movement of the tire within the rim. Projecting ribs P upon both ring B and flange H secure the tire against any lateral shifting.

The size and shape of the cushioning chambers M shown at Fig. 1 vary from those shown at Fig. 2, the former being formed for use upon the back or driving wheel where the tire is subject to considerable circumferential friction and strain when taking the drive or during movement of the vehicle, consequently it is necessary for the projections E to have a good grip upon the tire. In the case of the tire of the front or non-driven wheel see Fig. 2, there is only the friction set up by the load upon the wheel to overcome, therefore a less grip will serve, and in lessening the grip of the projections E upon the tire, we increase the size of the cushioning chambers and in a corresponding manner the elasticity of the tire.

The tire is mounted upon the rim from the side in a normal condition, the projections E on the rim fitting within the recesses L in the tire, and the projections K on the tire fitting within the dovetail spaces G in the rim. The ring B is then applied, the bolts being preferably passed through the rim and ring from the outside and secured by nuts R, which are preferably locked by cotters S or the like.

The size or shape and number of the projections and intervening spaces upon both tire and rim may be varied as desired.

What we claim as our invention, and desire to secure by Letters Patent, is—

In a wheel, the combination, with a channel-shaped rim provided with projections on its bottom, of an annular tire of elastic material provided with slots which engage with the said projections, said slots being of greater depth than the said projections and forming air chambers above the tops of the said projections and extending the full width of the said tire.

In testimony whereof we have signed our names to this specification in the presence of two subscribing witnesses.

TOM OLDFIELD.
J. A. SCHOFIELD.

Witnesses:
ABM. REED,
E. OLDFIELD.